Feb. 7, 1961
H. G. BUSIGNIES
2,971,190
POSITION FINDING SYSTEM
Filed Feb. 24, 1945
4 Sheets-Sheet 1
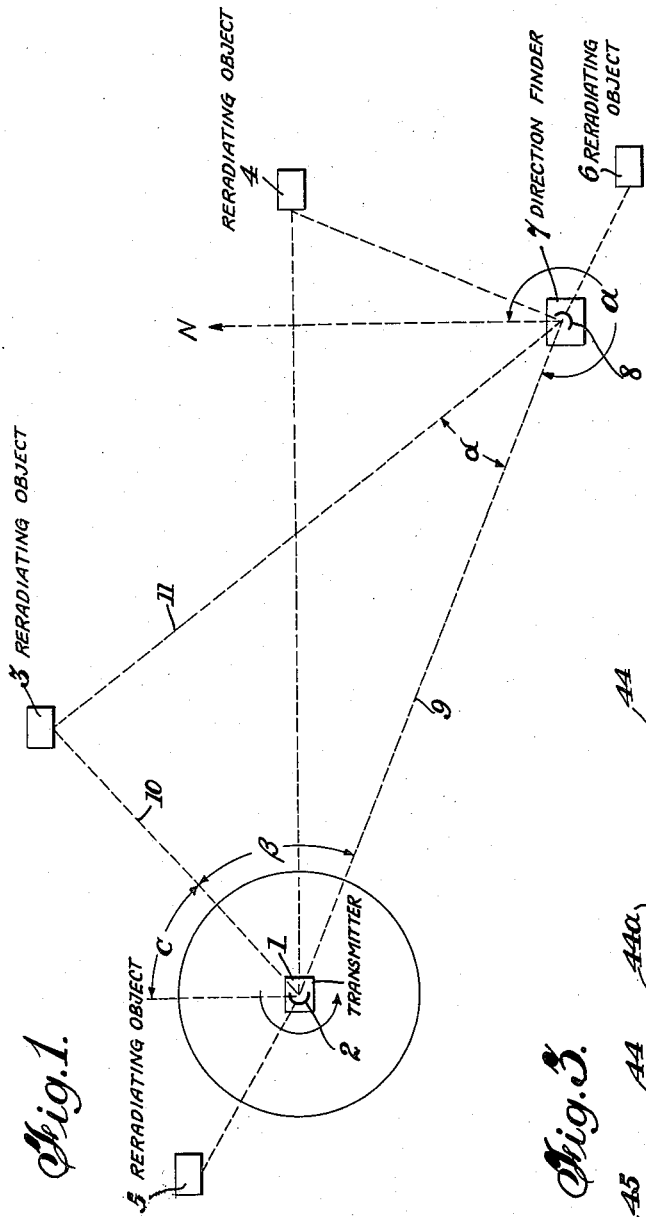
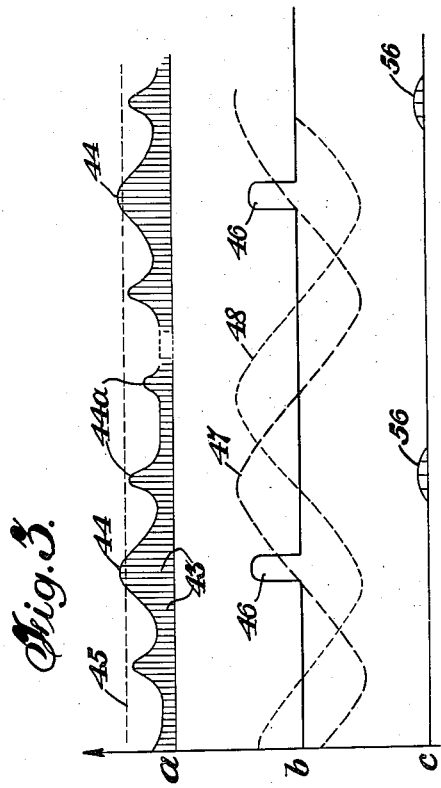
INVENTOR.
HENRI G. BUSIGNIES
BY
*R P Morris*
ATTORNEY Feb. 7, 1961  H. G. BUSIGNIES  2,971,190
POSITION FINDING SYSTEM
Filed Feb. 24, 1945  4 Sheets-Sheet 2

INVENTOR.
HENRI G. BUSIGNIES
BY
R P Morris
ATTORNEY

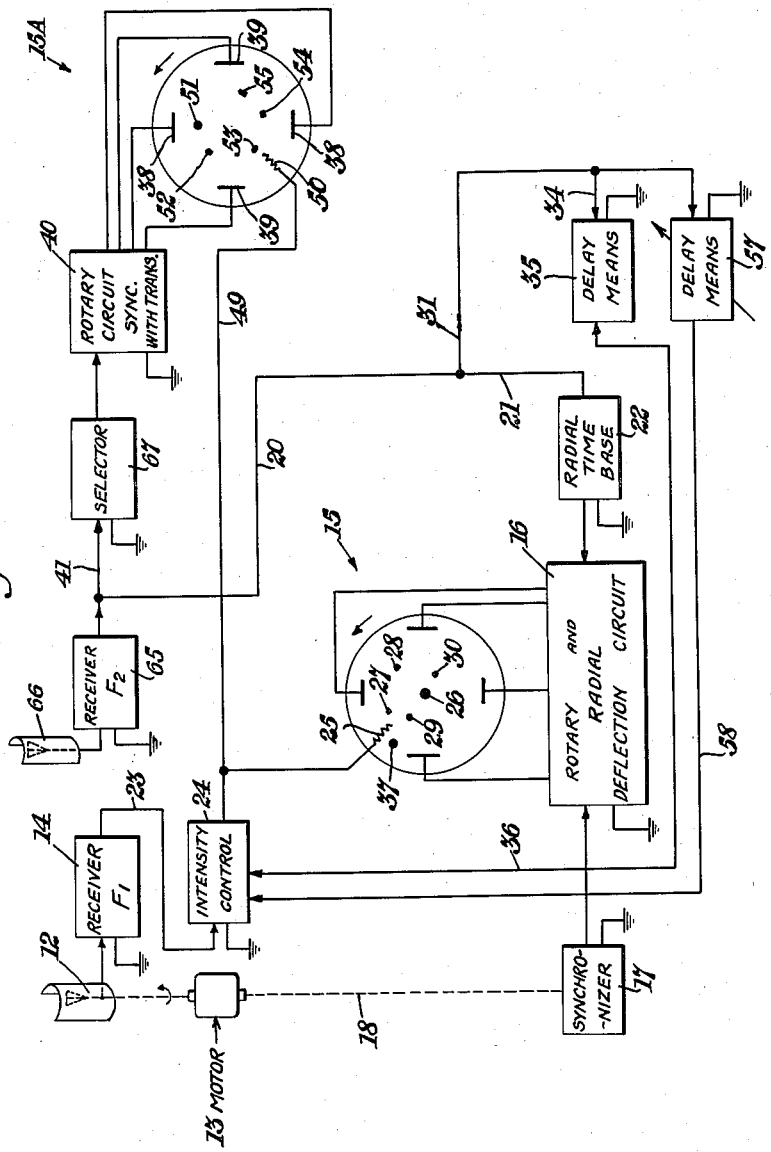

Feb. 7, 1961   H. G. BUSIGNIES   2,971,190
POSITION FINDING SYSTEM
Filed Feb. 24, 1945   4 Sheets-Sheet 4
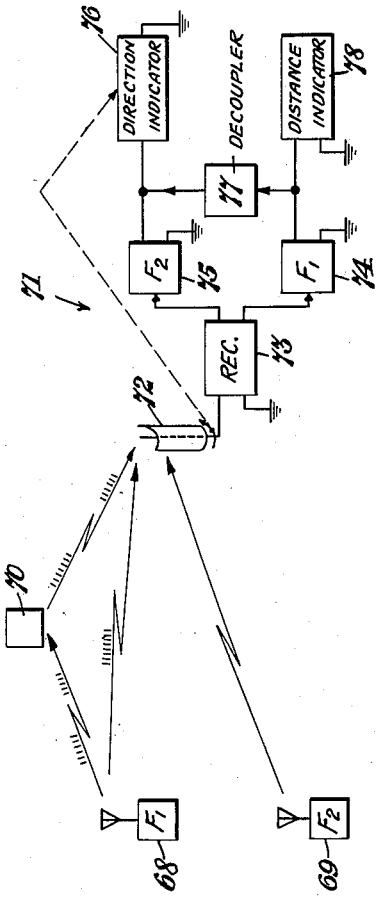
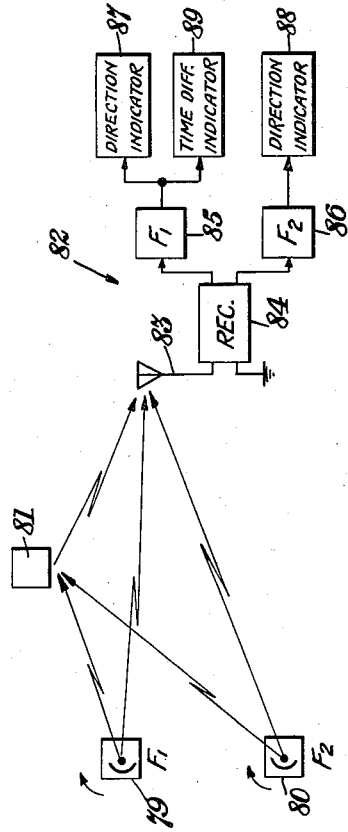
INVENTOR.
HENRI G. BUSIGNIES
BY
RP Morris
ATTORNEY

United States Patent Office 2,971,190
Patented Feb. 7, 1961

2,971,190

POSITION FINDING SYSTEM

Henri G. Busignies, Forest Hills, N.Y., assignor to International Telephone and Telegraph Corporation, a corporation of Maryland Filed Feb. 24, 1945, Ser. No. 579,567

35 Claims. (Cl. 343—112)

This invention relates to position finding systems and more particularly to systems wherein, at a receiver station, indicating parameters may be determined with respect to a single radio transmitting station and a reradiating object or objects.

Position finding systems in which the position of a transmitter or reradiating object may be determined by means of radiated and reflected waves have been proposed. Further, other position determining systems wherein triangulation on two or more known fixed points can be obtained likewise have been proposed in the prior art. In all of these systems, however, it has been found generally necessary to know either the location of the two spaced equipments with respect to one another or additional parameters so that the position of the receiver with respect to the transmitters may be obtained. Moreover, even then only the location of the receiver with respect to these known objects is obtained and other objects cannot be located.

In many cases it is desirable to find the position at a receiving station with respect to a transmitter and one or more reradiating objects when the position of these reradiating objects with respect to one another and/or the transmitter is unknown at the receiving station. For example, in obstacle detection equipments it may be desirable to locate the obstacle detection transmitter at a point separated from a receiver point without resorting to special apparatus at this receiver point. Furthermore, it may be desirable, particularly for moving craft, to be able to ascertain their position relative to a fixed rotating transmitter not only angularly but as to distance, and/or to obtain the relative position of other obstacles in their vicinity.

It is an object of my invention to provide a sytsem and method for determining the location at a receiver of reradiating objects, in response to energy transmitted from a transmitter point spaced from the receiver.

It is another object of my invention to provide a position determining system wherein the relative position of a radio receiver and spaced transmitter and reradiating objects may be obtained at the receiver station.

It is a further object of my invention to provide a system for locating the position determining parameters of a rotatable transmitter arrangement and a reradiating object at a single remotely positioned receiving point.

It is a further object of my invention to provide a system wherein the angular relationship between a line joining a receiver and a transmitter and the transmitter and a reradiating object may be determined by measurements made at the receiving station.

It is a still further object of my invention to provide a direction finding receiver arrangement wherein two of the angles and the difference between one side of a triangle and the sum of the other two sides thereof, the triangle being defined by receiver equipment, rotating directive transmitter equipment and a reradiating object, located at respective apices thereof, may be determined at the single receiver point.

It is a still further object of my invention to provide a system wherein, upon determination of the location of a receiver with respect to a given transmitter, the location of other reradiating objects can be determined at the receiver.

According to one feature of my invention, I provide for obtaining the position determining parameters of a receiver at a fixed location with respect to a rotatable directive transmitter arrangement and a reradiating object, a directive receiver means for producing directive indications of the lines from the receiver to the transmitter and to the reradiating object. Further means is provided to compare the transmission time of energy from the transmitter to the direction finding receiver and from the transmitter to the receiver via the reradiating object to obtain the difference in such transmission time which corresponds to the difference in these distances. Further means is provided to obtain the relative timing between the instant when the transmitter is aimed toward the direction finder receiver and toward the reradiating object to ascertain the angle between the transmitter and the object and the transmitter and the receiver. With these parameters, the three angles of the triangle and the difference between one side of the triangle and the sum of the other two sides is obtained so that the precise position of these various elements with respect to one another may be readily ascertained. In addition, if the compass direction is known at the receiving station, then the actual position of the transmitter and reradiating object with respect to the receiver may be plotted. In many cases, however, it is sufficient that the pilot of a craft, for example, know its own direction of heading and the relative location with respect thereto of the transmitter or the transmitter and reradiating object or objects.

According to further features of my invention, the ground equipment and the equipment on the aircraft can be modified so that directive transmission may not be needed at both points. With the directive transmission at both ends as described above, pulses need not be used. It is clear that if the transmitter is provided for the purpose of furnishing location information to aircraft equipped with proper receivers the location of the transmitter may be known to the aircraft operator. In such cases, the receiver may be of such a nature that the operator can determine the receiver location with respect to the transmitter and knowing this can determine the position of other reflecting obstacles such as aircraft or the like in the vicinity of the transmitter and the receiver. In this case a second transmitter at a spaced known distance from the main transmitter may be provided so that the position of the craft relative thereto may be determined by triangulation. The second transmitter may operate as an active repeater, if desired, or may be a separate transmitter operating on the same or a different radio frequency. If the ground transmitters are highly directional for the purpose of transmitting the obstacle or reradiating object detecting energy, the receiver equipment may include a simple non-directional receiving antenna. The directive angle toward the reradiating objects can then be determined from the known rotary position of the directional transmitters at the time strong radiations of the objects are obtained. Such a system may be preferable for use in aircraft since it would simplify the equipment necessary to be carried by the plane.

On the other hand, if one of two known transmitters serves to transmit timed pulses, the location of reradiation objects may be obtained by use of a single sharply directive receiver on the craft. No directive transmission is required under these conditions.

A better understanding of my invention and the objects and features thereof may be had from the particular description of an embodiment thereof made with reference to the accompanying drawings, in which:

Fig. 1 is a diagrammatic plan view illustrating the general arrangement of the apparatus in accordance with my invention;

Fig. 2 is a schematic wiring diagram partly in block circuit illustrating a receiver equipment in accordance with my invention;

Fig. 3 is a set of curves used in explaining the operation of some of the circuits illustrated in Fig. 2;

Fig. 4 is a diagram of an alternative type of transmitter which may be used at the transmitting station shown in Fig. 1;

Fig. 5 is a modified receiver equipment which may be used in conjunction with the transmitter of Fig. 4; and Figs. 6 and 7 show other modifications of systems coming under the general principles of my invention.

Turning first to Fig. 1, a rotatable transmitter 1 which may be, for example, a rotatable directive distance determining transmitter equipment is illustrated. The directive pattern from transmitter 1 is caused to rotate, for example, in a counterclockwise direction as indicated by arrow 2. Preferably transmitter 1 is generally unidirectional but may have a sufficiently poor directive pattern so that a considerable amount of back radiation occurs. In the field of transmitter 1 are shown a plurality of reradiating objects 3, 4, 5 and 6. These reradiating objects may be simple reflector means such as any conductive body or may be repeater arrangements which serve to receive the energy from transmitter 1 and repeat it at amplified levels. Preferably the energy from transmitter 1 is radiated in the form of relatively short energy pulses as in the case of obstacle detection equipment.

At 7 is shown a receiver equipment of the direction finder type provided with a rotatable directive antenna 8. Antenna 8 preferably rotates at a speed considerably higher than the rotational period of the directive transmitter. For example, receiving antenna 8 may rotate from 50 to 100 times faster than the directive pattern of the transmitter so that sufficient energy will be received on the direction finder receiver in each direction of heading to reproduce indications of the transmitted energy. It will be clear from the showing that transmitter 1, reradiating object 3 and receiver 7 may be considered as being positioned at the apices of a triangle consisting of sides 9, 10 and 11. By means of the direction finding receiver, directional lines 9 and 11 may be readily measured to ascertain the angle $\alpha$ between these lines. Likewise, if the compass bearing is known the angle $\alpha$ may be obtained giving the actual bearings of transmitter 1 and reflecting object 3 with respect to the direction finder. Likewise, the direction finding receiver may have a time scale synchronized with the pulse transmission from transmitter 1 so that the relative time of receipt of energy directly over path 9 and by reradiation over paths 10 and 11 may be obtained. Thus, at the receiver the difference between these two paths may be readily observed. These measurements, however, are still insufficient to determine the relative position of the objects.

However, since transmitter 1 is rotating, the energy reaching direction finder 7 from this transmitter will pass through cyclic variations of maxima and minima. Accordingly, at the receiver the timing of occurrence of the maxima may be obtained, providing an indication of the speed of rotation of transmitter 1. Further reradiation from object 3, for example, will reach its maximum when transmitter 1 has rotated to position aligned with this radiating object. Accordingly, it is possible at the receiving station to produce a second indication corresponding to the maximum reradiation from object 3 and compare this with the speed of rotation of the transmitter 1. By making this comparison, the angle $\beta$ between lines 9 and 10 may be obtained. As a consequence, now it is seen that the position determining parameters necessary for solving completely the triangle 9, 10 and 11 have been obtained. Thus, at the single direction finding point 7, the position determining parameters of transmitter 1 and reradiating object 3 are obtained. While pulse transmission from radiator 2 is preferable for the distance measuring, it is clear that comparison of a direct and reradiated wave by known timing means such as phase comparison may be used for this purpose.

It will be clear from the foregoing discussion that the position parameters of any objects spaced from line 9 to provide a triangle may readily be determined at the direction finding receiver. It will be further clear that the angles $\alpha$ and $\beta$ will become less easily calculated as the reflecting objects approach a position in line with line 9. Accordingly, objects positioned as shown at 5 and 6 directly in line with line 9 are so located that the complete position determining parameters cannot all be obtained unless other position determining reradiating objects are present. In this position, angles $\alpha$ and $\beta$ tend to reduce to zero and to 180°, respectively, or vice versa. Accordingly, reradiating objects 5 and 6 are so positioned that only the direction toward the object and the spacing of the object with respect to the transmitter may be accurately obtained. However, even this indication may be quite useful. Furthermore, in general there will be other reradiating objects not directly on this line which will enable precise location of the transmitter and consequently precise location also of these reradiating objects. Only for reradiating objects directly on line 9 between transmitter 1 and receiver 7 it is not possible to obtain substantially the position of the objects.

The construction of the particular transmitting arrangement and the reradiating objects is immaterial to the operation of a system in accordance with my invention. However, the receiver equipment must be provided to obtain these various factors in order to produce the results desired. A receiver circuit suitable for this purpose is illustrated in Fig. 2. In this arrangement, I provide a rotatable directive antenna 12 which may be driven at a predetermined speed by motor 13. The energy received on antenna 12 is applied to a receiver 14 where it is preferably detected. The detected energy may then be applied to a pair of indicators 15 and 15A preferably of cathode ray oscillograph type. Indicator 15 is supplied with deflecting energy from rotary and radial deflection circuit 16. A synchronizer 17 driven by motor 13 and shaft 18 may be provided to produce the rotary deflection voltage. The synchronizer 17 is provided to assure rotary deflection of the cathode ray beam synchronously with the rotation of antenna 12. The received output pulses from receiver 14 are applied over lines 19, 20 and 21 to a radial time base generator 22. Radial time base generator 22 serves to provide a voltage to deflect the beam of indicator 15 radially in synchronism with the received pulses coming directly from transmitter 1 of Fig. 1. Thus, the beam of indicator 15 will tend to rotate in synchronism with antenna 12 and to be deflected radially in accordance with the timing of pulses from the transmitter. The output pulses from receiver 14 are also applied over line 23 and intensity control circuit 24 to a control grid 25 of indicator 15. Thus, the received pulses directly from the transmitter will serve to produce a bright spot 26 at the center of the screen and other spots at 27, 28, 29 and 30 corresponding, for example, in direction of reflecting objects 3, 4, 5 and 6 of Fig. 1, and in radial displacement relative to spot 26 to the difference in transmission time between the direct transmission over path 9 and the indirect transmission over paths 10 and 11. Thus, the angular position of the various reflecting objects with respect to the receiver equipment will be indicated.

However, since the pulses received directly from the transmitter serve to produce the radial deflection lines, the direction to the transmitter will not be shown. In order to provide for this directional indication, the directly received pulses may be applied over lines 19, 20 and 31 to a synchronizing pulse generator 32. Generator 32 should include a high Q circuit so that the pulses produced have a high constancy of recurrence corresponding to the directly received pulses. Since the reflected pulses may be greater than the directly received pulses for some orientations of the transmitter and receiver, a simple clipper circuit will not suffice. Pulses from the output of generator 32 may be applied over lines 33, 34 to a fixed delay means 35 and hence over line 36 to intensity control circuit 24. The fixed delay of delay means 35 is preferably chosen to provide a delay nearly equal to the greatest radial displacement time of the beam of indicator 15. As a consequence, an indicating pulse 37 is produced substantially at the end of the radial deflecting line which pulse represents the angular position of the transmitting station.

Indicator 15, therefore, will be seen to provide indications of the angular measurements between the direction finding receiver and the transmitter and reradiating objects, and also the difference between the length of side 9 and of sides 10 and 11 of Fig. 1, for each reradiating object. It is necessary, however, to obtain the measurements of angle β before the complete position determining parameters may be ascertained. For this purpose, indicator 15A is provided. Indicator 15A has supplied to its deflecting electrodes 38, 39 a rotating field, for example, the output of a two-phase sine wave generator constituting the rotary circuit 40. Accordingly, the beam of indicator 15A will be rotated in synchronism with the output of rotary circuit 40. This rotation may be synchronized with the rotation of the transmitter and to this end the rotary circuit 40 is made adjustable. The adjustment may be made manually by adjusting the frequency of the deflecting potential until the maximum indications produced by the output of receiver 14 will coincide. However, it is preferable to make this arrangement automatic so that manual adjustment is not needed. For this purpose, the output energy from receiver 14 is applied over lines 19 and 41 to a clipper circuit 42.

The received pulses directly from the transmitter which vary in amplitude in accordance with the direction of the transmitter and receiver may be represented as in curve $a$ of Fig. 3. Thus, the pulses vary in amplitude as shown at 43 producing maximum peaks 44 corresponding to the moment when the beam from transmitter 1 is turned directly toward the direction finding receiver. Intermediate lesser maxima will be obtained for each rotation of the receiver antenna as shown at 44a but only the grand maxima at 44 will be selected by clipper 42. Clipper circuit 42 serves to clip this wave at a clipping level 45 and to produce from this clipped wave synchronizing pulses 46 as shown in curve $b$. These synchronizing pulses may be used to synchronize the rotary circuit 40 to produce the waves 47 and 48 preferably timed and in phase quadrature with respect to one another producing the rotary deflecting potential for indicator 15A. The output from intensity control circuit 24, Fig. 2, may also be applied over a line 49 to a beam intensity control grid 50 of indicator 15A. Thus, as the beam sweeps around on the screen of indicator 15A, a brilliant spot 51 will be produced corresponding to the maximum of the received pulses directly from the transmitter. Other spots less brilliant than 51 will occur as indicated at 52, 53, 54 and 55 corresponding to the maxima of reradiated received pulses. The angular displacement of these pulses 52 to 55 with respect to pulse 51 corresponds in position to the angle β referred to in Fig. 1. Thus, on indicator 15A is provided a measure of this angle. It is clear, therefore, that with this circuit all of the parameters necessary for solving the position determining triangle will be indicated.

In general, the reradiating objects will be simply reflecting objects. As a consequence, the energy received from these objects will be of insufficient amplitude to produce indications at the receiver except during the period when the beam from the transmitter is traversing these objects. Thus, they may produce resultant pulses of relatively short duration as indicated at 56 in curve $c$ of Fig. 3.

In order to identify the pulses it is desired to observe on indicators 15 and 15A, a circuit arrangement may be provided wherein an indexing control of the beam may be applied to the indicators. For this purpose, the output pulses from synchronizing pulse generator 32 may be applied over line 33 to an adjustable delay means 57 and from delay means 57 over a line 58 to intensity control circuit 24. These pulses may serve to increase the gain of the intensity control so any of the received pulses occurring while the gain control pulses are present will produce an indication of increased brilliance on the indicator screen. Delay means 57 is adjustable over a sufficiently great range to cover the entire period between the directly transmitted pulses. Thus, the indexing pulse may be adjusted in position on the screens of indicators 15 and 15A to coincide with any selected one of the pulse indications at these screens. By suitably calibrating delay means 57, a direct measurement of the difference in distance may be readily obtained.

In Fig. 2, I have illustrated specific types of indicators. It should be clear that variations in these types of indicators may be readily provided without departing from the scope of my invention. It is clear that other forms of deflection means to produce the rotary deflection may be provided if desired. Likewise, instead of a single indicator 15 to provide the direction indications, a separate indicator may be provided if desired for producing the distance indications in a manner known in the prior art. Similarly, instead of using a control of intensity of the cathode ray beam to produce the object indications, it is clear that radial deflection of the beams may be utilized or other types of indications usual in oscillograph circuits may be provided as desired.

It should be further pointed out that in some instances it may be desirable to obtain the angular relationship β at the receiver without the additional direction and distance indicating arrangements. In this case, indicator 15 and the control circuits therefore may be omitted.

The system described above in connection with Figs. 2 and 3, may be used to determine the position of a rotatable directive transmitter even though the transmitter is not intended for such use. However, when it is desired to provide a transmitter arrangement for the purpose of producing indications at a receiver of the location of the transmitter and reradiating objects, the equipment may be constructed differently so that synchronizing signals will be assured of proper reception. For example, a transmitter of the type shown in Fig. 4 may be used at location 1 of Fig. 1. According to this arrangement, a pulse generator 59 supplies pulses to transmitter 60 operating at a first frequency F1 and to a second transmitter 61 operating at a second carrier frequency F2. Transmitter F1 has a rotatable directive antenna 62 corresponding to that shown in transmitter 1 while transmitter 61 may have an omi-directional radiator 63. In order to indicate when antenna 62 is oriented in a particular direction, the rotation of antenna 62 may be caused to produce special signals in transmitter 61 by any desired means as indicated by the broken line 64.

The directly transmitted omni-directional pulses from antenna 63 may be received on a separate receiver circuit of the receiver illustrated in Fig. 5. The circuit shown herein is substantially similar to that shown in Fig. 2. However, receiver 14 is tuned to respond to carrier frequency F1 while a second receiver 65 which may be provided with a directive antenna 66 for obtaining the direction line toward the transmitter 1 is provided to receive the energy of frequency F2. The pulses in the output of receiver 65 are applied over line 41 to a selector 67 which serves to select the pulses occurring when the transmitter 62 is turned directly north or the other selected reference direction for the purpose of controlling the rotary sweep circuit 40 of indicator 15a. Also, the output pulses from receiver 65 may be applied directly to control the radial time base circuit 22 and may be applied directly over lines 31 and 34 to the delay means 35 and 57 to produce the desired intensity controls. On indicator 15A the angular position of the various pulses received on frequency F1 with respect to the normal reference direction of the transmitter will be shown. Thus, angle C, Fig. 1, will be obtained on this indicator instead of angle $\beta$. Since angle $\alpha$ is known and the direction of line 9 is known, angle $\beta$ may be obtained by subtraction of angle C from the total angle between line 9 and the known reference direction. It will be seen, therefore, that all of the indications may be obtained on the circuit arrangement of Figs. 4 and 5 that are determined in connection with the circuit of Fig. 2.

When the transmitter is set up for the purpose of guiding aircraft, the reradiating object 3, shown in Fig. 1, may be an active repeater if desired. Likewise, the distance 10 between transmitter 1 and reradiator 3 may be known on the craft as well as the orientation of line 10 with respect to the true north. In such a case, it is not necessary to measure angles $\beta$ or C since the position of the receiver 7 may be determined directly by triangulation. In this case then equipment such as shown in Fig. 2 or 5 without the auxiliary indicator device 15a may be used considerably simplifying the circuit on the craft.

Moreover, by using transmitters at separate frequencies for indicating the reradiating object 3 and the transmitter 1 as suggested in Fig. 4 and making antenna 62 of Fig. 4 extremely sharply directive, no directive antenna need be provided to obtain the direction to reradiating objects. The operator at the receiver may determine his location with respect to known transmitters 1 and 3 by triangulation on the regular direction finder equipment. Timing pulses for timing the indicator sweep circuits may be received through channels on the transmitters at 1 or 3. The location of various reradiating objects may then be determined on the indicator by the known directive angular position of the sharply directive transmitter and the timing of the reradiated pulses from the various objects without requiring a directive antenna on the craft. With this type of system, the equipment on the craft may be very simplified. It is thus necessary only to provide a simple direction finder for obtaining the location of the craft with respect to the transmitter and a pulse receiver operating to receive the directive signals for the purpose of indicating the location parameters of other reradiating objects.

In Fig. 6 is shown a still further modification of my invention comprising two radiators 68, 69 of the omidirectional type located a known distance apart. Radiator F1 operates at a first frequency F1 and radiator F2 at a second frequency F2. A reflecting object 70 is shown in the field of radiation from radiator 68. The receiver equipment shown at 71 is provided with a sharply directive antenna 72 which is continually rotatable. Energy from both transmitters 68 and 69 is received on antenna 72 and applied to a common receiver circuit 73. In the output of receiver circuit 73 are provided two filters 74 and 75 for selectively passing frequencies F1 and F2, respectively. The output energy from filters 74 and 75 may be combined in a common direction indicator device 76 in which the directional indications may be controlled jointly with the rotation of antenna 72 and the maximum received signals from F1 and F2. Also energy at F1 reflected from object 70 and other reflecting objects in the field of the radiator will be indicated on direction indicator 76. A decoupler circuit 77 is provided in the line interconnecting 74 and 75 to prevent energy at F2 from being fed back to the output of F1. In the output of F1 is also provided a distance indicator 78 which serves to provide an indication of the difference in distance between the energy directly transmitted from F1 to antenna 72 and that transmitted to antenna 72 from transmitter 68 by way of reflecting object 70. This distance indicator may be substantially of the type illustrated in connection with Fig. 2 or if desired, a separate receiving circuit may be provided to receive separately the synchronizing signals similarly to the arrangement as illustrated in Fig. 5. With this arrangement the position of the receiver with respect to transmitters 68 and 69 may be readily determined by triangulation. The operator, thus knowing this position and receiving the distance indication signals, may readily calculate the position of any reflecting objects in the field of radiator 68.

In Fig. 7 is illustrated still another arrangement of my invention requiring more simple receiver equipment on the craft. In this circuit, two transmitting radiators 79 and 80 operating at frequencies F1 and F2 and spaced apart a known distance are provided. At each of radiators 79 and 80 are provided highly directive rotatable antennas. The antennas may rotate at the same or at different speeds as desired. Energy from both of the radiators may also traverse object 81 as well as the receiver circuit of receiver 82. At receiver 82 is provided an omni-directional antenna 83 and a receiver 84 capable of passing both frequencies F1 and F2. In the output of receiver 84 are provided selective filters 85 and 86 for passing frequencies F1 and F2, respectively. Preferably, one of the transmitters 79 or 80 or both transmit energy in the form of spaced pulses. Since only one set of pulses is necessary for the operation of the invention, however, we will consider that these spaced pulses are being transmitted only from transmitter 79. The speeds of rotation of the antennas of transmitters 79 and 80 are known at the receiving position. Accordingly, separate directive indicators 87 and 88 are provided in the output of filters F1 and F2, respectively. These directional indicators are synchronized with the rotation of the respective transmitters so that directional indications may be provided when the transmitting antennas are aligned with receiving antenna 83. The separate indicators are desirable since the rotational speeds of the two transmitters may be different. It is clear, however, that if the rotational speeds of the two transmitters are identical or if suitable account is taken of the difference in speeds of rotation, the directional indications may be combined on a common indicator. In the output of filter 85 is also provided a time difference, distance indicator 89 which may again be substantially of the type described in Fig. 2.

While I have described a number of specific arrangements coming under the general principles of my invention, it will be clear to those skilled in the art that many other combinations of apparatus capable of performing the desired functions may readily be provided. If the position of the receiver with respect to the transmitter is determined then the position parameters of any reflecting objects in the field of the transmitter may be determined by measuring the direction toward the object and obtaining a distance parameter indication by comparison of energy reradiated from the object with that transmitted from the radiator. Other known forms of distance indicating arrangements may be provided in place of the various triangulation methods outlined herein. In this case then it is clear that the receiver may include only the directional circuits for obtaining the direction of the reradiating object to be located and other means for obtaining the distance indicating parameters in response to the reradiated energy.

While I have described my invention particularly with respect to a desired embodiment thereof, it should be distinctly understood that this description is made merely

I claim:

1. The method of obtaining at a receiving point spaced a predetermined distance from a radiator, the location parameters of a reradiating object, comprising receiving at said point energy reradiated from said object and from said radiator, determining the direction from said receiver to said object in response to received reradiated energy, and measuring the timing between said received reradiated energy and the timing of energy received from said radiator to determine the distance parameter of said reradiating object.

2. The method of obtaining at a receiving point spaced a distance from a radiator, the location parameters of reradiating objects, comprising obtaining the position of said receiver with respect to said radiator, receiving at said point energy reradiated from said objects and from said radiator, obtaining the directions from said receiver to each of said objects in response to respective received reradiated energy, and measuring the timing of said received reradiated energy with the timing of energy from said radiator to determine the distance parameters of said reradiating objects.

3. The method of determining at a receiving point the location parameters of a reradiating object located in the field of a radiator spaced from said receiving point, comprising obtaining at said receiver point the location parameters of said radiator, receiving at said point energy from said radiator and energy reradiated from said object, obtaining from said received reradiated energy the direction from said receiving point to said reradiating object, and measuring the timing between said received reradiated energy and the timing of the energy radiated from said radiator to determine the distance parameters of said reradiating object.

4. The method of determining the position parameter with respect to a receiver of a reradiating object located in the field of a transmitter spaced from said receiver and transmitting energy toward said reflecting object, comprising obtaining the position of said receiver with respect to said transmitter, receiving the reradiated energy from said object, determining the direction to said reradiating object in response to said received reradiated energy, determining distance parameters by comparison of the received reradiated energy timing with respect to the timing of the transmission of said energy from said transmitter.

5. A method of providing indications of the location parameters of a reradiating object with respect to a receiver, comprising directively transmitting from a predetermined point a radio frequency energy pattern of a predetermined directive pattern, sweeping the directive pattern over a given area including said reradiating object, determining the direction of said receiver with respect to said predetermined point, receiving the transmitted pulses reradiated from said object, determining from said received pulses at said receiver the direction to said reradiating object, and determining a distance indication parameter of said object in response to said transmitted and reradiated pulses.

6. A system for determining at a receiver point spaced a predetermined distance from a radiator, the location parameters of reradiating objects, comprising means at said point for receiving energy from said radiator and energy reradiated from said objects, directive direction determining means at said point, means for varying the directivity of said directive means for determining the directions from said receiver to said objects in response to said reradiated energy, and time comparison means for comparing the timing of said received reradiated energy with the timing of energy from said radiator to determine the distance parameters of said reradiating object.

7. A system for determining at a receiving point spaced a distance from a radiator, the location parameters of reradiating objects, comprising means at said point for determining the position of said receiver with respect to said radiator, a receiver at said receiving point for receiving energy reradiated from said objects, directive direction determining means, means for varying the directivity of said directive means for determining the directions from said receiver to said objects in response to said received reradiated energy, and time comparison means for comparing the timing of said received reradiated energy with the timing of energy from said radiator to determine the distance parameters of said reradiating object.

8. A receiver system for determining the location parameters with respect to said receiver of a reradiating object located in the field of a transmitter spaced from said receiver and transmitting energy toward said reflecting object, comprising means for determining the location parameters of said receiver with respect to said transmitter, receiver means for receiving the reradiated energy, and means responsive to said received reradiated energy for determining the direction to said reradiating object in response to said received reradiated pulses.

9. A radio position determining system for providing indications of the location parameters of a reradiating object with respect to a receiver, comprising a transmitting station for directively transmitting from a predetermined point in a predetermined directive pattern, means for sweeping the directive pattern over a given area including said reradiating object, means at said receiver for determining the direction of said receiver with respect to said predetermined point, means for receiving the transmitted energy reradiated from said object, means for determining at said receiver the direction to said reradiating object, and means for determining from said received reradiated energy the relative timing of the received reradiated energy to produce a distance indication parameter of said reradiating object.

10. A system for determining at a single receiver point the position of a reflecting object in the field of a transmitting system including a pair of spaced transmitters, comprising means at said point for receiving energy from said transmitters, means for determining the location parameters of said transmitters relative to said point in response to said received energy, means for receiving energy reradiated from said object at said point, adjustable directive means for determining the direction of said object in response to the received reradiated energy, and means for determining the distance determining parameters of said object in response to said received reradiated energy.

11. A system according to claim 10, wherein one of said transmitters is a directive transmitter, and said means for receiving energy is directional.

12. A system according to claim 10, wherein said transmitters operate at different carrier frequencies, at least one of said transmitters transmitting energy in the form of spaced pulses, said system further comprising means for separating said received transmitted signals, said distance parameter determining means being responsive to said spaced pulse energy.

13. A system according to claim 10, wherein one of said transmitters is a repeater station, said receiver further comprising a rotatable directive receiving antenna system.

14. A system according to claim 10, wherein said transmitters are omni-directional and operate at different carrier frequencies, at least one of said transmitters transmitting energy in the form of spaced pulses, said receiver further comprising a sharply directive receiver antenna, and means for separating said received transmitted signals of different frequencies.

15. A system according to claim 10, wherein one of said transmitters serves to transmit synchronizing signals, said receiver further comprising means for receiving said synchronizing signals, and means responsive to said synchronizing signals for measuring said distance determining parameters.

16. A method of obtaining position determining parameters of a transmitter and reradiating object at a single location, said transmitter, object and location being positioned in spaced relation to one another, comprising directly receiving at said location energy transmitted directly from said transmitter and after reradiation by said reradiating object, obtaining measurements of the angles from said location to said transmitter and said object, and comparing the timing of said received energy for obtaining the difference in distance from said location directly to said transmitter and to said transmitter by way of said object.

17. A method of obtaining position determining parameters of a transmitter and a reradiating object at a given location, said transmitter, object and location being positioned at apices of a triangle, comprising receiving energy transmitted directly by said transmitter and after reradiation from said object at said location, determining two angles of said triangle and the difference in distance from said location directly to said transmitter and to said transmitter by way of said object.

18. A method of obtaining at a given location spaced from a rotary directive pulse transmitter, position determining parameters of a reradiating object in the field of said transmitter, comprising directively receiving the reradiated pulses at said location to measure the relative angular position of a direction line from said location to said object, measuring the time of arrival of the directly transmitted and the corresponding reradiated pulses at said location to determine the difference in distance between a line from said transmitter to said location and a line from said transmitter to said object and hence to said location, and measuring the relative time of maximum received directly transmitted and retransmitted pulse energy at said location to measure the angle between a line from said transmitter to said location and a line from said transmitter to said object.

19. A position determining system for determining the position parameters of a reradiating object from a given receiving location spaced from a rotating transmitter system comprising means at said location for directively receiving energy reradiated from said object, means for indicating the direction of said object at said location in response to said received energy, means for indicating the rotary angular position of said transmitter when aligned with said object, and means for indicating the difference in distance of said transmitter and said object from said location, whereby the position parameters relative to said location may be determined.

20. A method of obtaining position determining parameters of a directive, rotating pulse transmitter and a reradiating object at a given location, said transmitter, object and location being positioned at apices of a triangle, comprising directionally receiving pulses from said transmitter and said reradiating object at said location, obtaining measurements of two angles of said triangle in response to said received pulses, and obtaining the difference in distance from said location directly to said transmitter and to said transmitter via said object in response to said received pulses.

21. A method of obtaining at a given location position determining parameters of a rotary directive pulse transmitter and a reradiating object in the field of said transmitter, comprising directively receiving the reradiated pulses at said location to measure the relative angular position of direction lines from said location to said transmitter and said reradiating object, measuring the time of arrival of the directly transmitted and the corresponding reradiated pulses at said location to measure the difference in distance between a line from said transmitter to said location and a line from said transmitter to said reradiating object and hence to said location, and measuring the relative time of maximum received directly transmitted and retransmitted pulse energy at said location to measure the angle between a line from said transmitter to said location and a line from said transmitter to said reradiating object.

22. A position determining system for determining the position of a rotating directive pulse transmitter and a reradiating object from a given receiving location comprising means at said location for directively receiving pulse energy transmitted directly from said transmitter and reradiated from said reradiating object, means for indicating the direction of said transmitter and said reradiating object at said location in response to said received pulse energy, means for indicating the rotary angular position of said transmitter when aligned with said reradiating object, and means for indicating the difference in distance directly to said transmitter and to said transmitter via said reradiating object from said location.

23. A radio position determining system comprising a pulse transmitter, a reradiating object in the path of the radiation from said transmitter, a receiver system at a predetermined location spaced from said transmitter a predetermined distance and spaced from said reradiating object, said receiver comprising a directive antenna, means for rotating said antenna at a predetermined speed, an oscilloscope indicator means, mean for scanning the beam of said oscilloscope indicator in synchronism with rotation of said antenna, a time base generator, means for synchronizing said time base generator with the pulses transmitted from said transmitter, means for coupling said radial time base generator to said indicator means to produce a time base indication, a receiver coupled to said antenna for receiving pulses from said transmitter and said reradiating object, means for applying said received pulses to said indicator means to control a characteristic of the beam, whereby indications of the direction from said receiver to said object and the difference in time between directly received transmitted pulses, and pulses reradiated from said object are produced on said indicator means.

24. A radio position determining system for determining the position of reradiating objects in the radiation field of directive transmitter rotating at a predetermined speed of rotation at a given location spaced from said transmitter, comprising a receiver system at said location, said receiver comprising a directive antenna, means for rotating said antenna at a speed substantially higher than the speed of rotation of said transmitter, a first oscilloscope indicator, means for rotating the beam of said oscilloscope indicator in synchronism with rotation of said antenna, a radial time base generator, means for synchronizing said radial time base generator with the pulses transmitted from said transmitter, means for coupling said radial time base generator to said oscilloscope to produce radial deflection of said beam, a receiver coupled to said antenna for receiving pulses from said transmitter and said reradiating object, means for applying said received pulses to said oscilloscope to control a characteristic of the beam, means for producing a fixed delay of less than the repetition period of the pulses received from said transmitter, means to apply said fixed delayed pulses to said oscilloscope to control the intensity of said beam, whereby on said first oscilloscope are produced indications of the direction from said receiver to said transmitter and said reradiating objects and the difference in time between directly received transmitted pulses, and pulses reradiated from said object, a second oscilloscope, deflection means for producing a rotary deflection of the beam of said second oscilloscope, means for applying said received pulses to said second oscilloscope to control a characteristic of said second oscilloscope beam, and means responsive to maximum amplitude of said received transmitted pulses for synchronizing said deflection means with rotation of said transmitter, whereby an indication of the angular position of said directive transmitter when aligned with said reflecting objects is produced.

25. A radio position determining system comprising, a directive pulse transmitter rotating at a predetermined speed, a reradiating object in the path of the radiation from said transmitter, a receiver system at a predetermined location spaced from said transmitter and said object, said receiver comprising a directive antenna, means for rotating said antenna at a speed substantially higher than the speed of rotation of said transmitter, a first oscilloscope indicator, means for rotating the beam of said oscilloscope indicator in synchronism with rotation of said antenna, a radial time base generator, means for synchronizing said radial time base generator with the pulses transmitted from said transmitter, means for coupling said radial time base generator to said oscilloscope to produce radial deflection of said beam, a receiver coupled to said antenna for receiving pulses from said transmitter and said reradiating object, means for applying said received pulses to said oscilloscope to control the intensity of the beam, means for producing a fixed delay of less than the repetition period of the pulses received from said transmitter, means to apply said fixed delayed pulses to said oscilloscope to control the intensity of said beam, whereby on said first oscilloscope are produced indications of the direction from said receiver to said transmitter and said reflecting object and the difference in time between directly received transmitted pulses and pulses reradiated from said object, a second oscilloscope, deflection means for producing a rotary deflection of the beam of said second oscilloscope, means for applying said received pulses to said second oscilloscope to control the intensity of said second oscilloscope beam, and means responsive to maximum amplitude of said received transmitted pulses for synchronizing said deflection means with rotation of said transmitter, whereby an indication of the angular position of said directive transmitter when aligned with said reflecting object is produced.

26. A position determining system for determining the position parameters of reradiating objects from a given receiving location spaced from a rotating pulse transmitter comprising, means at said location for directly receiving pulse energy from said transmitter and reradiated from said objects, means for indicating the direction of said transmitter and said objects at said location in response to said received pulse energy, means for indicating the rotary angular position of said transmitter when aligned with each of said objects, and means for indicating the differences in distance directly to said transmitter and to said transmitter via each of said objects from said location.

27. A position determining system for determining the position parameters of a rotating directive pulse transmitter and a reradiating object from a receiving location comprising rotary directive means at said location for receiving pulse energy from said transmitter and reflected from said reradiating object, means for indicating the direction of said transmitter and said reradiating object at said location in response to said received pulse energy, means for indicating the rotary angular position of said transmitter when aligned with said object in response to energy received therefrom, and means synchronized with the timing of the transmitted pulses and responsive to the received reflected pulses for indicating the difference in distance directly to said transmitter and to said transmitter via said object from said location.

28. A method of obtaining at a single location position determining parameters of a rotary directive pulse transmitter and reradiating objects in the field of said transmitter, comprising directively receiving the reradiated pulses at said location to measure the relative directions to said transmitter and said reradiating objects, measuring the time of arrival of the directly transmitted and the corresponding reradiated pulses at said location the difference in distance between a line from said transmitter to said location and lines from said transmitter to said reradiating objects and hence to said location, and measuring the relative time of maximum received directly transmitted and retransmitted pulse energy at said location to measure the angular position of said transmitter upon receipt of maximum energy reradiated from said objects to indicate the angle between a line from said transmitter to said location and a line from said transmitter to said objects.

29. A method of obtaining at a single location position determining parameters of a rotary directive pulse transmitter and a reradiating object in the field of said transmitter, comprising directively receiving the reradiated pulses at said location to measure the relative angular position of direction lines from said location to said transmitter and said reradiating object, measuring the time of arrival of the directly transmitted and the corresponding reradiated pulses at said location the difference in distance between a line from said transmitter to said location and a line from said transmitter to said reradiating object and hence to said location, measuring the maximum amplitude recurrence of the pulses directly received from said rotary transmitter to obtain the speed of rotation of said directive transmitter at said location, and measuring the time of receipt of said reradiated pulses relative to said speed at said location to measure the angle between a line from said transmitter to said location and a line from said transmitter to said reradiating object.

30. A radio position determining system for determining relative to a given location the position parameter of a directive transmitter rotating at a predetermined speed of rotation, and a reradiating object in the path of the radiation from said transmitter, comprising a receiver system at said location spaced from said transmitter and said reradiating object, said receiver comprising a directive antenna, means for rotating said antenna at a speed substantially higher than the speed of rotation of said transmitter, a first oscilloscope indicator, means for scanning the beam of said oscilloscope indicator in one characteristic in synchronism with rotation of said antenna, a time base generator, means for synchronizing said time base generator with the pulses transmitted from said transmitter, means for coupling said time base generator to said oscilloscope to scan said beam in a different characteristic to produce a time base reference, a receiver coupled to said antenna for receiving pulses from said transmitter and said reradiating object, means for applying said received pulses to said oscilloscope to control a characteristic of the beam, whereby on said first oscilloscope are produced indications of the direction from said receiver to said transmitter and said reradiating object and the difference in time between directly received transmitted pulses, and pulses reradiated from said object, a second oscilloscope, deflection means for producing a deflection of the beam of said second oscilloscope, means for applying said received pulses to said second oscilloscope to control a characteristic of said second oscilloscope beam, and means for synchronizing said deflection means with rotation of said transmitter, whereby an indication of the angular position of said directive transmitter when aligned with said object is produced.

31. A system according to claim 30 further comprising a reference pulse generator, means to apply the reference pulses generated to said oscilloscope indicator, and means for adjusting the position of said reference pulses reflective to the indications on said indicators to coincide with the indications of a desired one of said indications.

32. The method of obtaining at a remote location the angular alignment of a directive transmitter and a reradiating object, comprising receiving energy from said transmitter and said object, producing an indication synchronously with the maximum of the received energy from said transmitter, and producing a second indication corresponding to the maximum of the received energy from said reradiating object displaced in time from said first indication in accordance with the angular position of said transmitter.

33. A method of obtaining the measurement of an angle between a line from a receiver location to a rotary transmitter, and a line from said transmitter to a reradiating object, at said receiver, comprising receiving energy from said transmitter and said object, producing a sweep in synchronism with rotary movement of said transmitter, and producing an indication on said sweep trace in response to the received reradiated energy from said object, whereby the position of said indication on said sweep trace indicates said angle.

34. A system for obtaining at a remote location an indication of the alignment of a rotary directive transmitter and a reradiating object, comprising means for receiving energy from said transmitter and said object, an indicator, means for producing a first indication synchronously with the maximum of the directly received energy from said transmitter, and means for producing a second indication in response to the maximum of the received energy from said reradiating object, said second indication being displaced with respect to said first indication in accordance with the angular position of said transmitter at the corresponding time.

35. A system for indicating at a remote location the alignment of a rotating directive transmitter with a reradiating object in the path of the radiation from said transmitter, comprising a receiver system at said location, said receiver comprising an antenna, a receiver coupled to said antenna for receiving pulses from said transmitter and said reradiating object, an oscilloscope indicator device, deflection means for producing a deflection of the beam of said indicator device, means for applying said received pulses to said indicator device to control a characteristic of said oscilloscope beam, and means responsive to maximum amplitude of said received transmitted pulses for synchronizing said deflection means with rotation of said transmitter, whereby an indication of the angular position of said directive transmitter when aligned with said reradiating object is produced.

References Cited in the file of this patent

UNITED STATES PATENTS

| | | |
|---|---|---|
| 1,981,884 | Taylor et al. | Nov. 27, 1934 |
| 2,085,798 | Gerhard | July 6, 1937 |
| 2,086,742 | Scharlau | July 13, 1937 |
| 2,134,535 | Runge | Oct. 25, 1938 |
| 2,177,061 | Gerhard | Oct. 24, 1939 |
| 2,420,408 | Behn | May 13, 1947 |
| 2,425,008 | Royden | Aug. 5, 1947 |
| 2,427,219 | Luck | Sept. 9, 1947 |
| 2,427,220 | Luck | Sept. 9, 1947 |
| 2,502,464 | Lehmann | Apr. 4, 1950 |
| 2,546,970 | Busignies | Apr. 3, 1951 |

FOREIGN PATENTS

| | | |
|---|---|---|
| 116,666 | Australia | Oct. 10, 1941 |
| 116,667 | Australia | Oct. 10, 1941 |